United States Patent [19]

Miller

[11] 4,097,809
[45] Jun. 27, 1978

[54] LOCAL EVENT BROADCAST SYSTEM

[75] Inventor: Albert J. Miller, Campbell, Calif.

[73] Assignee: Engineering Systems Corporation, Santa Clara, Calif.

[21] Appl. No.: 719,680

[22] Filed: Sep. 1, 1976

[51] Int. Cl.² .......................... H04B 3/60; H04B 7/20
[52] U.S. Cl. ..................................... 325/54; 325/308; 343/200
[58] Field of Search ...................... 325/51, 53, 54, 308; 343/200; 179/82

[56] References Cited
U.S. PATENT DOCUMENTS
2,259,316  10/1941  Lyle .......................................... 325/54

OTHER PUBLICATIONS
McGraw-Hill Encyclopedia of Science and Technology – vol. 13 – 1971, pp. 480–482.

*Primary Examiner*—Benedict V. Safourek
*Assistant Examiner*—Marc E. Bookbinder

[57] ABSTRACT

A system for providing coverage of a local event such as a sporting event for the spectators thereof includes a plurality of portable radio broadcast receivers to be carried by the spectators. A central control mobile unit provides program material relating to the event to a plurality of radio relay units disposed about the site of the event. Associated with each relay unit is a local transmitter which broadcasts to the portable receivers in the immediate area. Each relay or chain of relays may be provided with unique programmatic material which pertains to the activities in the vicinity of the associated local transmitters.

10 Claims, 1 Drawing Figure

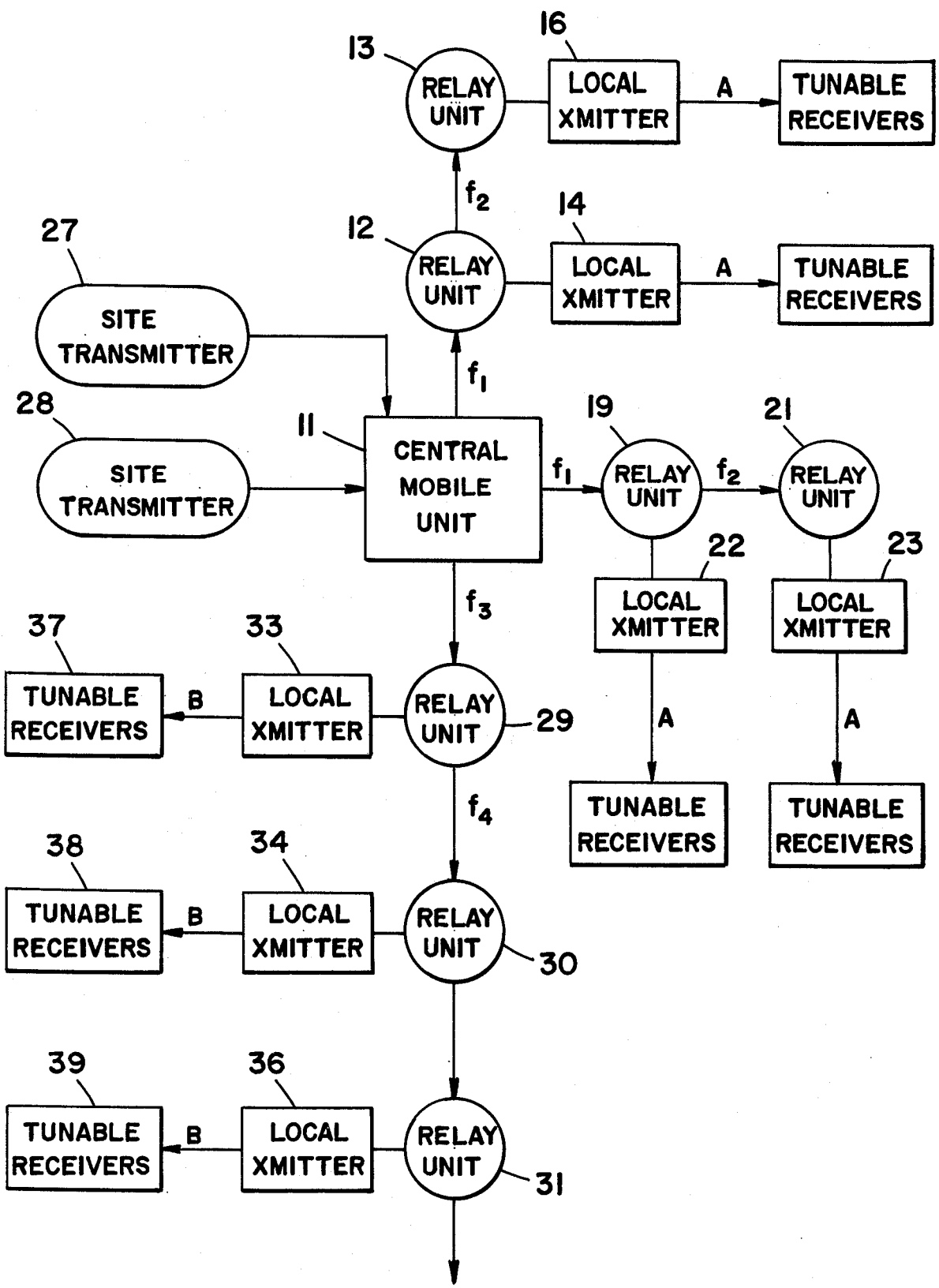

LOCAL EVENT BROADCAST SYSTEM

BACKGROUND OF THE INVENTION

There are a great many local events at which it would be extremely desirable to broadcast information concerning the event to the spectators or participants thereof. This function is usually performed by a public address system, often in conjunction with an illuminated display sign. Although this form of information transmission system is thought to be adequate, it should be noted that at many sporting events the spectators carry portable radios to receive the commentary and play by play description broadcast by the community radio media. Obviously many spectators desire more specific information than that provided by the public address system.

Further, there are many events at which many activities are occurring over a wide area and within the same time frame. For example, at golf tournaments, gymnastic or track and field meets, regattas, political conventions, industrial shows, auto races, parades, or the like, it is impossible to apprise the spectators or participants of information of general interest, or to broadcast information pertaining to a particular event to the immediate vicinity of the event. The resulting lack of information diminishes the pleasure of the spectators and adversely affects the performance of the participants.

It is known in the prior art to provide locally broadcast informational radio programs, in museums and the like, for the edification of the spectators therein. In these systems the signals are all of the same frequency, and the listener-spectator must select the program only by changing location. That is, the listener has no control over the program being heard. Also, the program material is recorded, and could not be applied to a live event.

SUMMARY OF THE INVENTION

The present invention generally comprises a local event broadcast system in which pertinent programmatic material is provided to spectators interested in specific activities occurring within the local event. The broadcast system includes a central control mobile unit which coordinates incoming information concerning the event, and which produces program material relating to various facets of the event. The program material is transmitted as a plurality of programs to a plurality of radio relay chains, the radio relays being advantageously placed so that the program material coincides with the activities occurring in the vicinity of each relay station.

The system also includes a plurality of tunable radio receivers, each to be carried by one of the spectators. Associated with each relay station is a low power local radio transmitter which transmits the pertinent program material to the local spectators. The spectators may tune their individual radio receivers to the particular program which pertains to the activity they are viewing, so that the commentary they receive relates directly to the activity of the immediate area.

THE DRAWING

The FIGURE is a block diagram representation of the local event broadcast system of the present invention.

DESCRIPTION OF THE PREFERRED EMBODIMENT

With reference to the accompanying Figure, the present invention generally comprises a limited broadcast system which provides coverage of a particular event to the spectators in attendance at the event. It includes a central mobile unit 11 which houses the main program studio of the system. In the central mobile studio live activity reports and pretaped program material are gathered, edited, screened, and rebroadcast.

The program material is radio broadcast to a plurality of radio relay units 12, 13, 19, 21, 29, 30, 31, etc., which are disposed about the area in which the event is occurring. For example, in the instance of a golf tournament the radio relay units would be disposed about the golf course so that maximum coverage of the area would be obtained. The relay units are battery powered, and broadcast at a maximum radiated power of 100 milliwatts. Due to the low power output of the relay units they may use the standard citizen band without interfering with the broadcasts of local CB radios.

The radio relay units receive a signal at a first frequency and repeat it at a second frequency. For example, the central mobile unit broadcasts to the relay units 12 and 19 at a frequency $f_1$, and these units in turn repeat the signal at the frequency $f_2$ which is received by the relay units 13 and 21, respectively. At the same time a second program may be broadcast to the relay unit 29 at a frequency $f_3$. The second program pertains to the activities occurring in the area in which the relay units 29, 30, and 31 are disposed. The unit 29 broadcasts to the relay unit 30 at a frequency $f_4$, and the relay unit 30 broadcasts to the unit 31 at a frequency different from the previous mentioned frequencies, which unit 31 may in turn rebroadcast to additional relay units as shown.

Associated with each relay unit is a local transmitter which transmits the audio portion of the signal at low power to the tunable receivers in the immediate area of the local transmitter. Local transmitters 14, 16, 22, and 23 are associated with relay units 12, 13, 19, and 21 respectively. The local transmitters transmit at frequency A on the standard AM radio band, radiating 100 milliwatts and therefor covering a rather small area. Only those spectators in the immediate area of the local transmitters could receive the program material, which pertains to the event they are watching.

The local transmitters 33, 34, and 36 which are associated with the relay chain 29-31 all transmit at a frequency B on the standard AM radio band. To return to the example of the golf tournament, these relay units and local transmitters may be disposed about the final hole of the tournament, broadcasting program material which pertains particularly to the action occurring at the final hole. Those spectators in that vicinity could tune their receivers 37-39 to the frequency B to receive the special programming relating to the event taking place before their eyes. The general programming broadcast on frequency A could therefor be excluded by those individuals at the final hole. It is within the scope of the invention to provide a plurality of relay chains each carrying unique programming to separate areas where sub-activities of the general event are occurring.

The live portions of the program material originate from remote units associated with site transmitters 27 and 28. These units would include on the scene reporters to provide pertinent commentary, and broadcast at low power on the AM or CB band to the central mobile unit.

The tunable broadcast receivers are battery powered, and are provided with earplug type earphones and no speakers. In this manner those spectators and participants who do not wish to hear the program commentary will not be subjected to it.

I claim:

1. A local event radio broadcasting system for transmitting a plurality of different programs respectively pertaining to a corresponding plurality of sub-events at different locations within a main local event location to mobile listeners respectively at the different locations, comprising: a central unit means for assembling and radio broadcasting the plurality of programs at a corresponding plurality of different frequencies; a plurality of relay unit means respectively receiving the different frequencies so that each relay unit means receives only one program of the plurality of programs broadcast from said central unit means; a plurality of local transmitter means respectively at the separate sub-event locations, each receiving a program from only one of said relay unit means and radio broadcasting said program at low power within the associated sub-event location; each of said relay unit means retransmitting the program received by it at a radio frequency different from the radio frequencies of said central unit means and different from the frequencies of said local transmitter means; a plurality of additional relay unit means for receiving the retransmitted programs of said first mentioned relay unit means; a plurality of additional local transmitter means transmitting the program received by respective ones of said additional relay unit means at a radio frequency that is the same as the transmitting radio frequency of the first mentioned local transmitter means associated with the relay unit means rebroadcasting the same program; and a plurality of portable radio receivers for the mobile program listeners within the sub-event location for receiving the program broadcast by at least one of the local transmitter means within such sub-event location.

2. The system of claim 1, wherein the local transmitter means at one sub-event location transmits at a radio frequency different from the radio frequency being transmitted by a local transmitter means at another sub-event location; and said portable radio receivers being manually tunable between the two frequencies of the local transmitter means.

3. The system of claim 1, further including a plurality of site transmitter means at different sub-event locations for receiving audible signals and radio broadcasting such signals to the central unit means at a frequency different from the radio broadcasting frequencies of said central unit means different from the radio broadcasting frequencies of said local transmitter means.

4. The system of claim 1, wherein said portable receivers are standard AM radio receivers; and wherein each of said local transmitters transmits at a power not greater than 100 milliwatts.

5. A local event radio broadcasting system for transmitting a program to a plurality of mobile listeners within the vicinity of the local event, comprising: a central control unit means for assembling and radio broadcasting the program at a first radio frequency; first relay unit means receiving the first radio frequency broadcast of said central unit means and rebroadcasting the same program at a second different radio frequency; a first local transmitter means receiving said rebroadcast from said first relay unit means and transmitting said program at a third radio frequency and at a power level sufficiently low to confine said first transmitter transmission to said vicinity of the local event; second relay unit means receiving the rebroadcast program from said first relay unit means at said second frequency; a second local transmitter means transmitting said program at said third radio frequency and at a power level sufficient to confine said second transmitter transmission to said vicinity of the local event and a plurality of portable radio receivers for receiving the program transmitted by any one of said local transmitter means.

6. The system of claim 5, wherein each of said local transmitter means broadcasts at a power not greater than 100 milliwatts and at a standard AM radio frequency.

7. The system of claim 5, further including site transmitter means at different locations within said vicinity of said local event for receiving audible signals and radio broadcasting such signals to the central unit means at at least one frequency different from the radio broadcasting frequency of said central unit means and different from the radio broadcasting frequencies of said local transmitter means.

8. A method of providing program coverage only within the location of a main event, with various programs different from each other and relating to sub-events of the main event, comprising the steps of: assembling and radio broadcasting the plurality of programs at corresponding plural different frequencies from a central location; separately receiving each of the different frequency radio broadcasts from the central location at at least a corresponding number of different relay locations within the locality of the main event, so that at each relay location only one program of the plurality of programs broadcast from the central location is received; at each of the relay locations, radio broadcasting, respectively, the program received at the relay location at a low power only covering the area of the sub-event location; providing a plurality of mobile spectators within each sub-event location with portable radio receivers tunable to the low power radio broadcast from the relay location within the respective sub-event location so as to receive only the program relating to such sub-event.

9. The method of claim 8, wherein the local low power broadcast is at a power of not greater than 100 milliwatts and at a standard AM radio frequency.

10. The method of claim 8, further including the step of radio broadcasting on-the-stop coverage of the various sub-events at different frequencies corresponding to the sub-events and which are different from the previous mentioned broadcast frequencies; and receiving the on-the-spot sub-event radio broadcasts at the central location for use in assembling and broadcasting the programs related to such sub-events.

* * * * *